Dec. 7, 1926.
1,610,148
E. V. PEIRSON
CHILD'S VEHICLE
Filed July 9, 1925
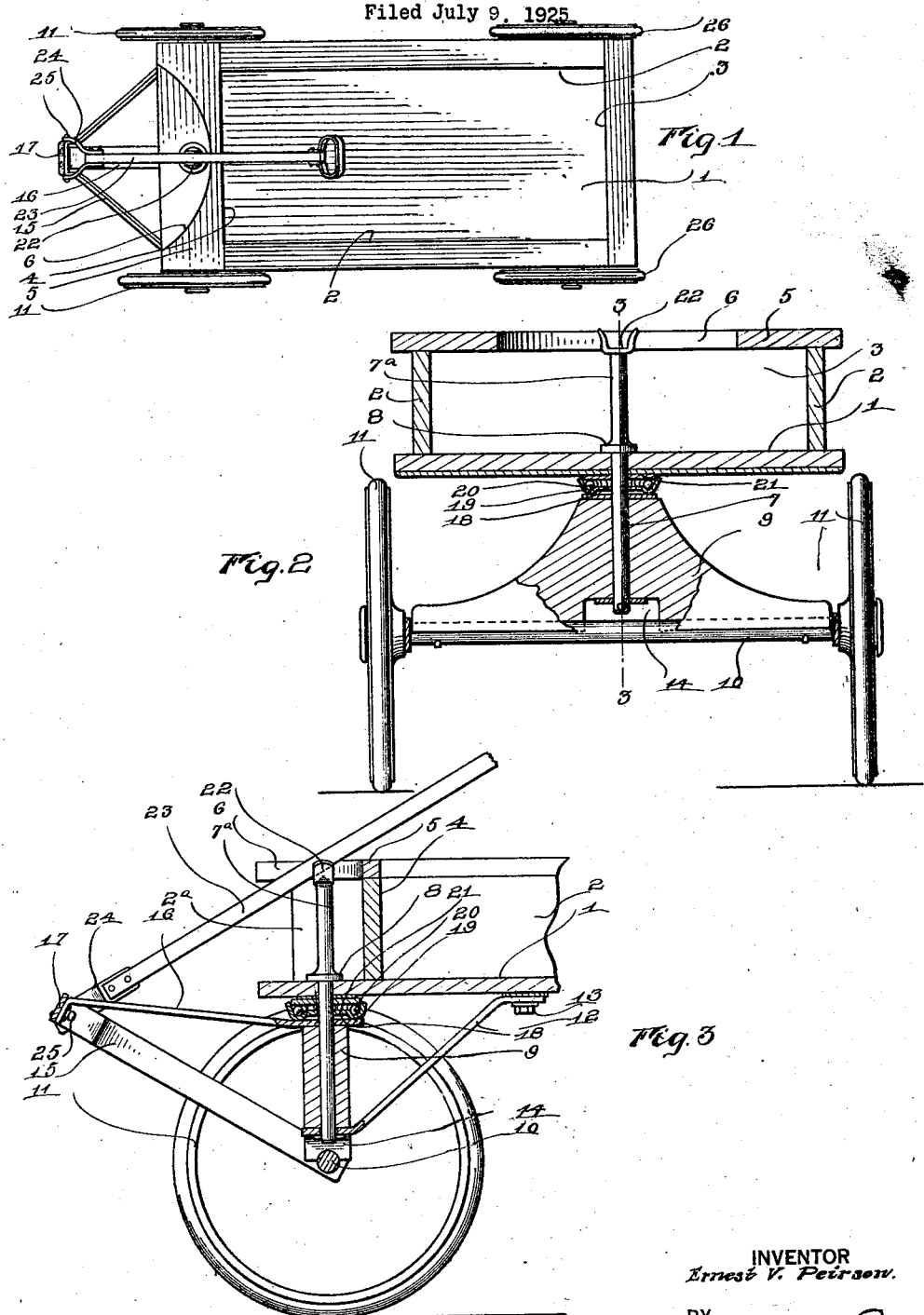
INVENTOR
Ernest V. Peirson.
BY
his ATTORNEYS Patented Dec. 7, 1926.

1,610,148

UNITED STATES PATENT OFFICE.

ERNEST V. PEIRSON, OF NEWARK, NEW JERSEY.

CHILD'S VEHICLE.

Application filed July 9, 1925. Serial No. 42,434.

The present invention relates to a child's vehicle, and an object thereof is to improve the construction of a vehicle whereby the steering of the same from the body of the vehicle may be more readily accomplished.

To these and other ends, the invention consists of certain parts and combinations of parts, all of which will be hereinafter described: the novel features being pointed out in the appended claims.

In the drawings:

Fig. 1 is a plan view of the vehicle;

Fig. 2 is a transverse section through the vehicle; and

Fig. 3 is a section on the line 3—3, Fig. 2.

Referring more particularly to the drawings, 1 indicates the bottom wall of the body which has rising therefrom side walls 2, an end wall 3 and front wall 4. The front wall 4 is spaced from the forward end of the bottom wall 1 and the end walls 2 project beyond the front wall, as shown in 2$^a$. A finishing piece 5 surmounts the front wall 4 and side walls 2 beyond the front wall and is formed with a curved portion 6 which provides an opening above that portion of the bottom wall 1 projecting beyond the front wall 5.

In the projecting portion of the bottom wall 1, a king bolt 7 is mounted to turn. This king bolt has a shoulder 8 cooperating with the upper surface of the bottom and a bearing portion extending from the shoulder in a downward direction. On this bearing portion the front axle frame 9 turns, the axle frame being, in this instance, made of wood and supporting an axle 10 on which the front wheels 11 are mounted to turn. A brace 12 is secured at 13 to the under side of the body 1 and has an opening at its forward end through which the king bolt projects, the brace being positioned in a pocket 14 formed on the underside of the axle frame 9 above the axle 10. Projecting forwardly and upwardly from the front wheels is a substantially V-shaped frame 15 which is supported in a rigid position with reference to the axle frame 9 by a brace 16 secured at 17 to the front end of the steering frame and having its rear end surrounding the king bolt 7 above the axle frame 9.

The rear end of the brace 16 forms a support for the disk 18 which has an annular groove 19 formed therein, the outer wall of the groove projecting beyond the upper surface of the disk and the groove forming a raceway for an annular series of balls 20. A flat annular disk 21 of a diameter substantially equal to the diameter of the outer wall of the groove surrounds the king bolt 7 and rests upon the balls 20.

The king bolt is extended upwardly at 7$^a$ above the shoulder 8 and at its upper end carries a saddle 22. This saddle forms a support for the steering handle or bar 23 when the latter is swung to a rear position. The handle, in this instance, has its forward end provided with two arms 24 which are pivoted at 25 to the outer sides of the V-shaped steering frame 15 at the forward end of the latter. Rear wheels 26 may support the rear end of the body in any suitable manner.

A child's vehicle constructed in accordance with this invention has its steering tongue supported from an extension on the king bolt so that lateral strain on the pivot of the handle is reduced to a minimum and, at the same time, the friction on the body which usually occurs when no support is provided is eliminated. The king bolt can turn as the handle swings. The handle engages the king bolt in rear of the forward edge of the bottom of the body due to the cutting away of the front portion of the vehicle and in this way the handle may be thrown to the rear a greater distance. A novel strengthening means is provided for the front axle frame and a novel bearing between the axle frame and the body is employed. The king bolt is braced at its lower end so that the strain on the upper end thereof through the handle does not tend to shift the rotative position of the king bolt laterally.

What I claim as my invention and desire to secure by Letters Patent is:

1. A child's vehicle comprising a body having a vertical front wall arranged in rear of the front edge of the bottom wall, a front axle frame, a king bolt extending through and mounted to turn in the bottom of the body in front of the front wall and having the front axle frame mounted to turn thereon below the body, said king bolt being extended upwardly and provided with a saddle at its upper end, a steering frame connected to the front axle frame, and a handle pivoted to the steering frame in advance of the body and having its upper end adapted to be supported by said saddle, the bottom of the saddle being so positioned that the handle will, when resting in the saddle, be free from engagement with the front wall and the bottom wall.

2. A child's vehicle comprising a body, a king bolt passing through the bottom of the body and having a shoulder engaging the top surface of said bottom, said king bolt projecting above and below the bottom, being mounted to turn in the bottom and having a saddle above the shoulder and a bearing portion below the shoulder, a brace secured to the lower end of the bearing portion of the king bolt and the bottom of the body in rear of the king bolt, an axle frame mounted to turn on the king bolt between the bottom of the body and the brace, a steering frame projecting forwardly from the front axle frame, and a handle pivoted to the forward portion of the steering frame and adapted to be swung rearwardly to co-operate with the saddle at the upper end of the king bolt, the bottom of the saddle being so positioned that when the handle rests thereon, it may swing without engagement with the bottom or front wall of the body.

ERNEST V. PEIRSON.

CERTIFICATE OF CORRECTION.

Patent No. 1,610,148, granted December 7, 1926.

to ERNEST V. PEIRSON.

It is hereby certified that error appears in the above mentioned patent requiring correction as follows: In the grant and in the heading to the printed specification, the residence of the patentee is erroneously given as Newark, New Jersey, whereas said residence should have been given as Newark, New York; and that the said Letters Patent should be read with this correction therein that the same may conform to the record of the case in the Patent Office.
Signed and sealed this 22nd day of February, A. D. 1927.

Seal.

M. J. Moore,
Acting Commissioner of Patents.